Feb. 7, 1967     C. W. CHANLUND     3,302,262
CONCRETE MOLD VIBRATION TABLE WITH
CUSHION MEANS AND PRESSURE FORM
Filed Jan. 22, 1964     7 Sheets-Sheet 3

INVENTOR
Carl W. Chanlund
BY Bacon & Thomas
ATTORNEYS

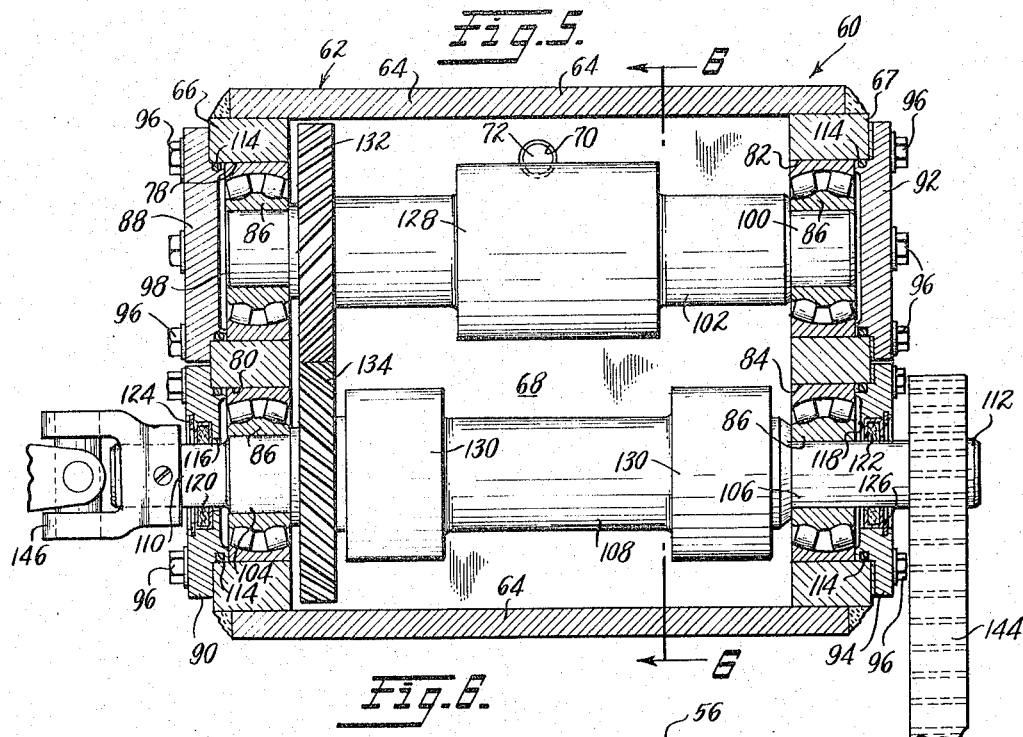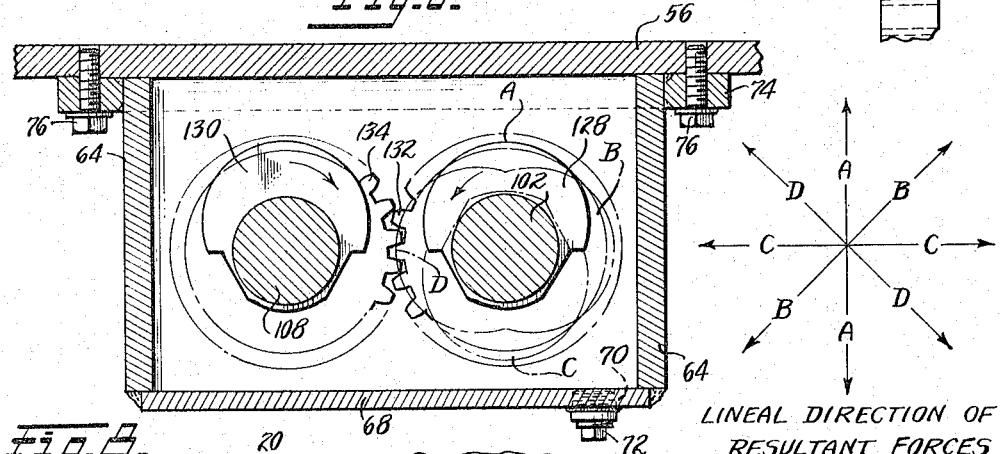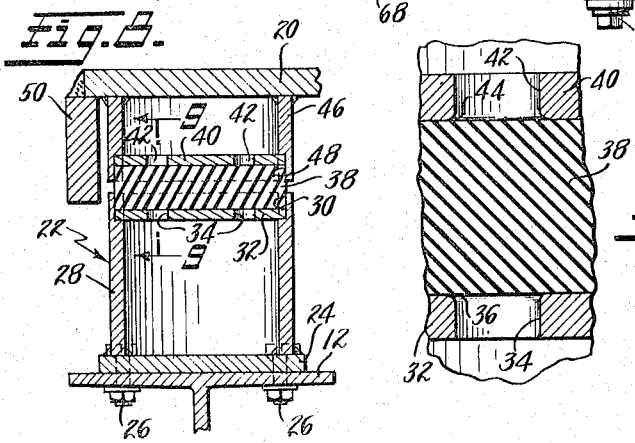

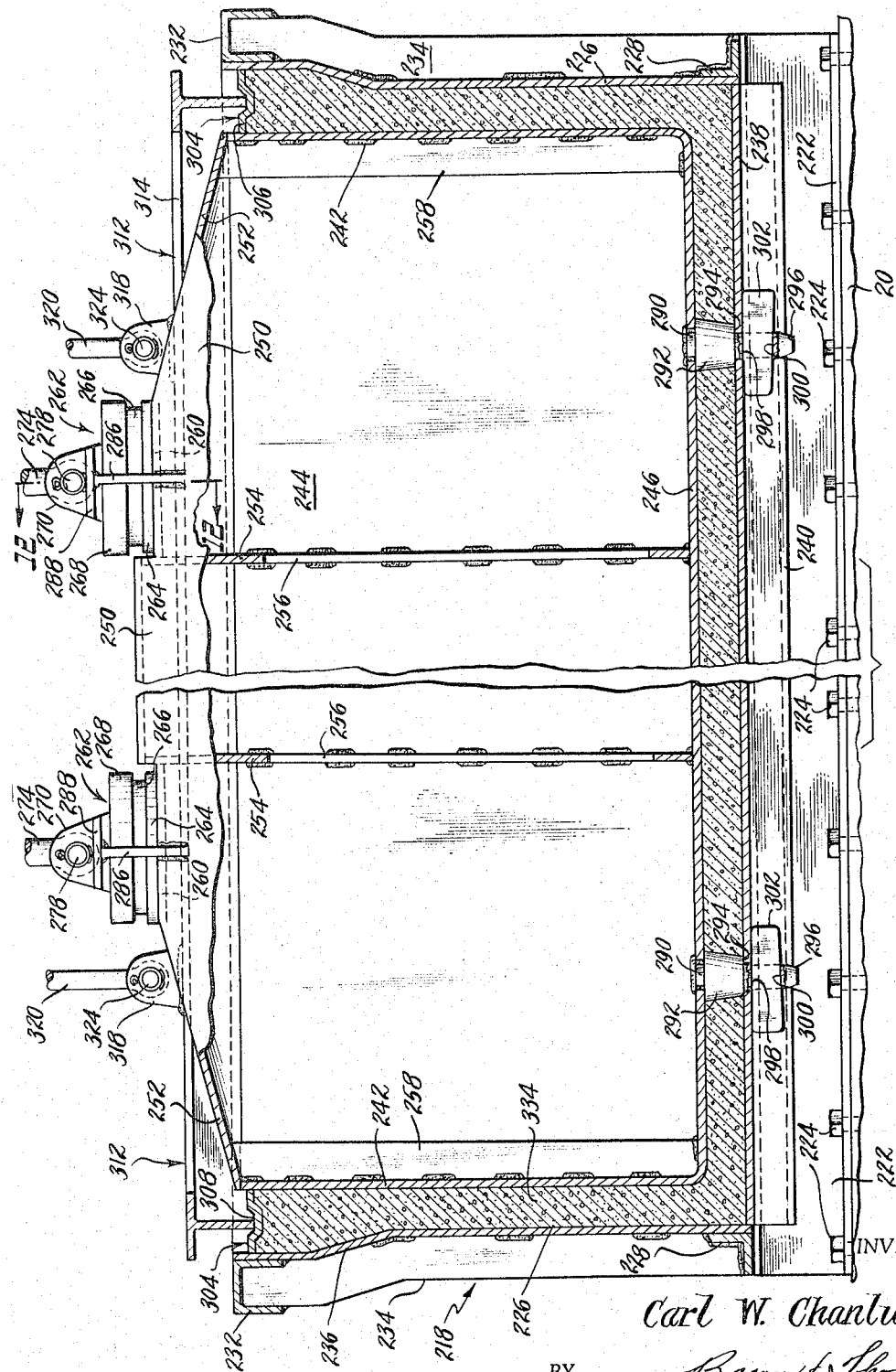

INVENTOR
Carl W. Chanlund
BY Bacon & Thomas
ATTORNEYS

United States Patent Office 3,302,262
Patented Feb. 7, 1967

3,302,262
CONCRETE MOLD VIBRATION TABLE WITH CUSHION MEANS AND PRESSURE FORM
Carl W. Chanlund, Nampa, Idaho, assignor to Idaho Concrete Pipe Co., Nampa, Idaho
Filed Jan. 22, 1964, Ser. No. 339,456
19 Claims. (Cl. 25—41)

The apparatus of the invention can be utilized to produce several different kinds of molded concrete products, depending upon the configuration of the mold being utilized. In the invention, a mold is provided into which a concrete mixture is placed, the mold resting upon a novel vibration table which is constructed to vibrate it in a preselected manner. The movements of the vibration table cause the concrete to flow evenly into all portions of the area defined by the mold and to be compacted, and thus result in a properly shaped, voidless concrete product.

The vibration table of the invention is mounted upon uniquely constructed cushion legs which lessen the amount of vibration transferred to the supporting structure, and includes a pair of vibrator units arranged for synchronous operation. Each vibration unit includes a pair of parallel shafts having eccentric weights thereon. The shafts are coupled together by a pair of helical gears to rotate in opposite directions at identical speeds, and are arranged to produce a vibratory motion upon rotation thereof. By varying the phase angle between the eccentric weights on the two shafts of each vibrator, and/or by varying the coupling between vibrator units, it is possible to obtain several different vibration patterns for the vibration table.

The mold utilized to form the concrete mixture is mounted on the vibration table, and a framework extends above said table. A pressure form apparatus is suspended from the framework by a hydraulic cylinder arrangement, and is arranged to press downwardly on the concrete contained within the mold while the vibration table is in operation. The combined action of the pressure form and the vibration table causes the wet concrete mixture to be distributed and become compacted, and hence to form into a substantially perfectly molded article.

The framework also has hydraulic equipment mounted thereon for removing both the finished concrete product and a portion of the mold from the vibration table. This equipment is mounted on rails, and is also utilized to transport the freshly molded concrete product to a suitable curing area. Thus, the apparatus of the invention is constructed for large scale production of molded concrete products.

It is an object of this invention to provide a vibration table for use in the manufacture of concrete products, construction to provide controlled vibrations according to a preselected pattern.

Another object of the invention is to provide a concrete molding apparatus constructed to produce molded concrete products having a uniform exterior surface and a compacted, voidless wall structure.

A further object is to provide a concrete product molding apparatus constructed to facilitate transport of a molded product from a mold to a curing area.

It is also an object to provide a vibrator unit for a vibration table, constructed to provide controlled vibrations in any one of several preselected directions.

Still another object is to provide a vibration table incorporating a pair of vibrator units, interconnected for synchronous operation.

An even further object is to provide a concrete product molding apparatus, including a pressure-applying mold member for applying pressure to a concrete mixture during vibration of the entire mold.

It is also an object to provide a cushion foot for supporting a vibration table, constructed to absorb a substantial portion of the vibrations emanating from said table to prevent their passage to the supporting structure upon which the table rests, and to isolate the table to prevent loss of vibrating forces which might otherwise be transmitted to said supporting structure.

Other objects and many of the attendant advantages of the present invention will become readily apparent from the following description, when taken in conjunction with the accompanying drawings, wherein:

FIG. 5 is an enlarged, horizontal sectional view, taken along the line 5—5 of FIG. 4, showing the construction of one of the vibrator units;

FIG. 6 is a vertical, sectional view, taken along the line 6—6 of FIG. 5, and shows in particular the configuration of the eccentric weight on the shafts of the vibrator unit;

FIG. 7 is a force diagram, showing the resultant force directions that can be obtained from different arrangements of the eccentric weights of the vibrator of FIG. 6;

FIG. 8 is an enlarged, fragmentary, vertical sectional view, taken along the line 8—8 of FIG. 3, showing the construction of one of the cushion feet for supporting the vibration table;

FIG. 9 is an enlarged, fragmentary, sectional view, taken along the line 9—9 of FIG. 8, showing the configuration of the extrusion holes in the supporting plates of the cushion foot;

FIG. 10 is an enlarged, fragmentary, vertical sectional view, taken along the line 10—10 of FIG. 2, showing the construction of the inner and outer forms of the mold of the invention;

The apparatus of the invention can be utilized, with mold changes, to construct concrete products of many different configurations. For the purposes of this description the invention will be described with respect to the making of the body of a concrete burial vault. However, it is to be understood that the invention is not to be limited to the manufacture of such a product.

Figure 1:
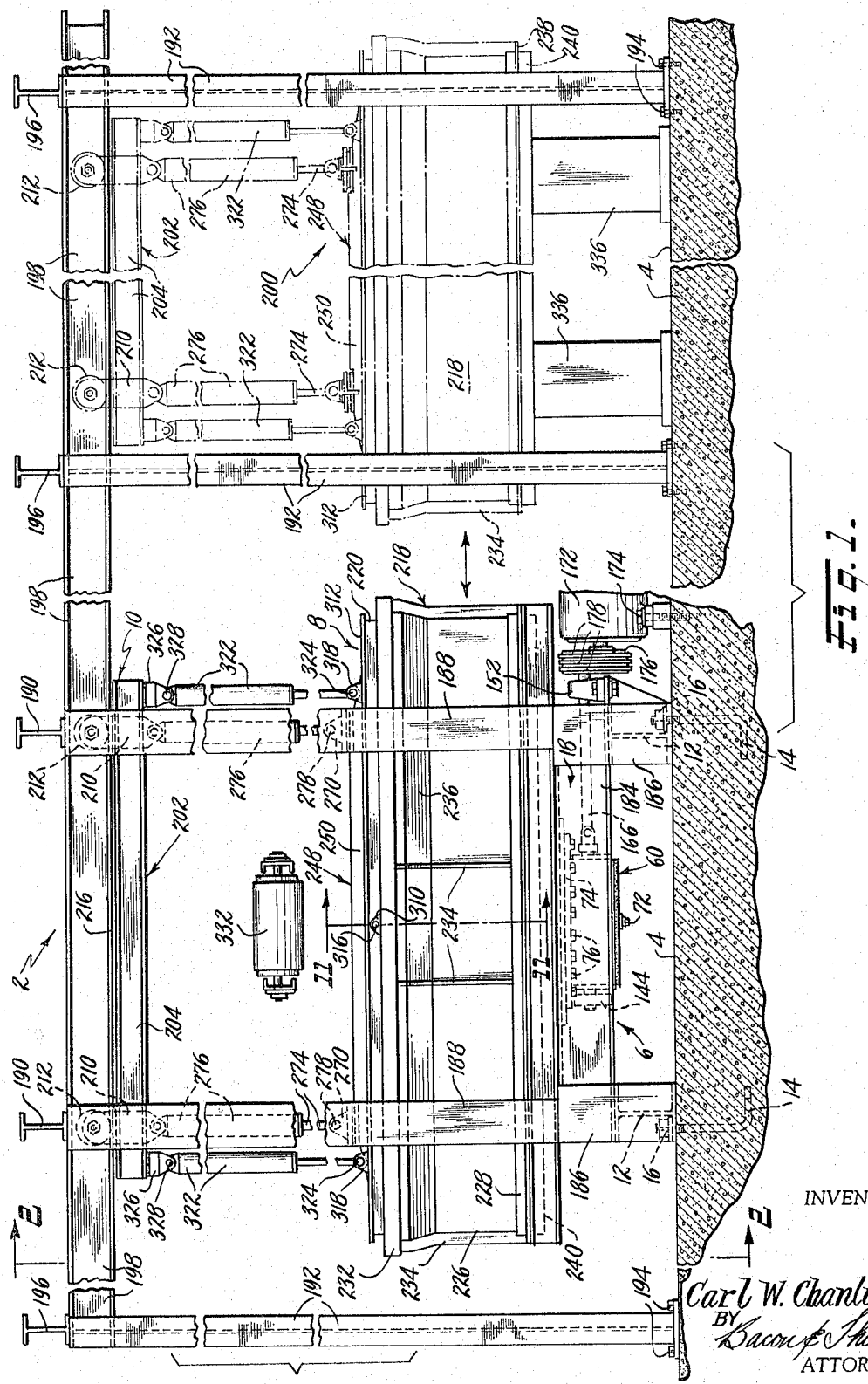
FIG. 1 is a fragmentary, side elevational view of the concrete product molding apparatus of the invention, with the work transfer carrier being positioned over the vibrator table.

Referring now to the drawings, the concrete product producing apparatus of the invention is indicated generally at 2 in FIG. 1, and is disposed to rest upon a concrete floor 4, or any other suitable supporting surface. The apparatus 2 includes a vibration table 6, which is attached to the floor 4, a mold 8 disposed to rest upon the vibration table 6, and a framework 10 extending above the vibration table and constructed to facilitate transport of the molded product and the mold and to exert pressure on the concrete mixture during the molding process.

The vibration table 6 is best shown in FIGS. 1–9, and includes a base comprising a pair of spaced, parallel I-beams 12, said I-beams 12 being secured to the floor by anchor bolts 14 and nuts 16, the lower ends of the anchor bolts 14 being embedded in the concrete floor 4. A platform 18 is disposed over the I-beams 12, and includes a rectangular platform plate 20 supported at each of its four corners by a cushion leg 22.

The cushion legs 22 are identical in construction, and the construction of one thereof is shown in detail in FIGS. 8 and 9. Referring to FIGS. 8 and 9, the cushion leg 22 therein includes a base plate 24, which is secured to one of the I-beams 12 by bolts 26. Resting upon the base plate 24 and welded thereto is the lower end of a vertically disposed lower cylinder 28, said cylinder 28 having an axially extending, cylindrical socket 30 in its upper end. Received within the cylindrical socket 30 is a circular bottom supporting plate 32, said plate 32 having a plurality of extrusion holes 34 extending therethrough.

Referring to FIG. 9, the upper edge 36 around each hole 34 is rounded, whereby to prevent damage to a cushion supported by said plate. Disposed to rest upon the bottom supporting plate 32 is a cushion 38, which can be constructed of gum rubber or the like; typically, the cushion 38 would have a thickness of about 1 inch.

A top supporting plate 40 is disposed on the upper face of the cushion 38, and has a plurality of extrusion holes 42 extending therethrough. The lower edge 44 of each extrusion hole 42 is rounded, in a manner similar to the rounded edges 36. An upper cylinder 46 is provided with an axially extending cylindrical socket 48 in its lower end, and the supporting plate 40 and the upper portion of the cushion 38 are received within said socket. The upper end of the cylinder 46 is welded to the undersurface of the platform plate 20.

The four cushion legs 22, as has been stated, are constructed in an identical manner, and function to limit the transmission of vibration shocks from the platform 18 to the beams 12, and to isolate the platform 18 to prevent draining of vibrations therefrom. The gum rubber cushion 38 tends to absorb vibration shocks, the rubber material expanding into the extrusion holes 34 and 42 to accommodate rapid and sudden shocks. It should be noted that the cushion 38 has a thickness sufficient to prevent the two opposed cylinders 28 and 46 from contacting except under extreme loads, which thickness is also substantially greater than the distance measured between the supporting plates 32 and 40 when the confronting ends of the cylinders 28 and 46 are in contact. The cushion legs 22 thus function to enhance the life of the apparatus of the invention, to limit the annoyance which would otherwise be caused by allowing vibrations to pass from the vibration table 6 to the floor 4, and to prevent the undesirable draning of vibrational forces from the table 6 to its supporting structure.

The platform plate 20 of the vibration table 6 has lateral reinforcing ribs 50 secured thereto to project downwardly from its lateral edges, and disposed to expand parallel to to the I-beams 12. Ribs 52 extend between the lateral ribs 50, and are positioned inwardly of the cushion legs 22. Spaced, parallel secondary ribs 54 extend between the ribs 52, and function to add further rigidity to the platform plate 20. Welded centrally of the plate 20, and positioned between the ribs 52, is a vibrator mounting plate 56, to which is secured a pair of vibrator units 58 and 60.

Figure 4:
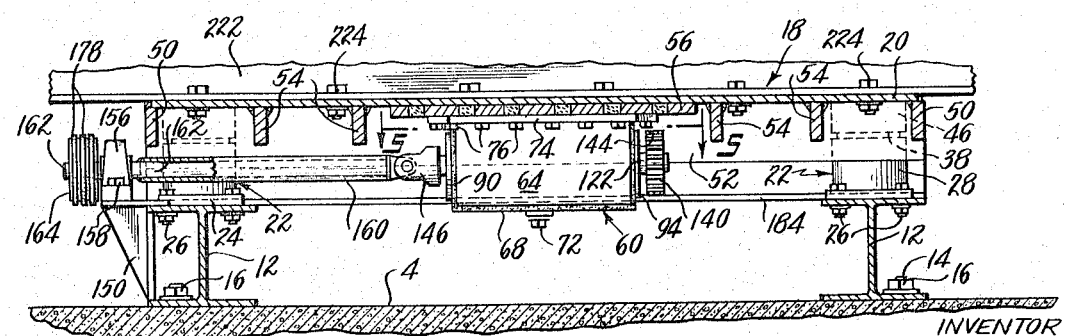
FIG. 4 is a fragmentary, vertical sectional view, taken along the line 4—4 of FIG. 3, showing one of the vibrator units and its power connection in side elevation.

The vibrator units 58 and 60 are substantially identical in construction, and hence only the vibrator unit 60 will be described in detail. Referring to FIGS. 4, 5 and 6, the vibrator unit 60 includes a housing 62, comprising a pair of side plates 64, a pair of end plates 66 and 67, and a bottom plate 68. The side, end, and bottom plates 64, 66, 67 and 68, respectively, are welded together to form the housing 62, and the bottom plate 68 has a bore 70 therein for reception of an oil drain plug 72. A peripheral flange 74 extends about the upper end of the housing 62, and is secured to the undersurface of the mounting plate 56 by bolts 76.

The end plate 66 has a pair of cylindrical openings 78 and 80 extending therethrough, which are aligned with a similar pair of openings 82 and 84, respectively, in the end plate 67. Bearing units 86 are received within each of the openings 78, 80, 82 and 84, and cover plates 88, 90, 92 and 94, respectively, are secured over said openings 78, 80, 82 and 84 by bolts 96.

Received within the bearing units 86 disposed within the aligned openings 78 and 82 are the opposite, reduced ends 98 and 100 of a cylindrical shaft 102. The opposite ends 104 and 106 of a second cylindrical shaft 108 are received within the bearing units 86 disposed within the aligned openings 80 and 84, said shaft 108 including cylindrical extensions 110 and 112 on its opposite ends 104 and 106, respectively.

Each of the cover plates 88, 90, 92 and 94 includes a cylindrical boss which is receivable within its respective bore 78, 80, 82 or 84, said bosses each having an O-ring seal 114 contained in a peripheral groove thereon. The cover plates 90 and 94 have counterbored cylindrical bores 116 and 118 extending therethrough for reception of the shaft extension 110 and 112, and seals 120 and 122 are secured within the counterbore portions of said bores 116 and 118 by snap rings 124 and 126, respectively.

The shaft 102 has a centrally positioned, eccentric weight 128 formed integrally therewith, said weight having a generally arcuate configuration, as is best shown in FIG. 6. The shaft 108 has a pair of eccentric weights 130 thereon, one positioned at each end thereof beyond the axial end faces of the weight 128. The two weights 130 have a cross-sectional configuration identical to that of the eccentric weight 128, and have a combined axial length corresponding to that of said eccentric weight 128; thus, the mass of the eccentric weight 128 is identical to the combined masses of the weights 130, and hence the shafts 102 and 108 will generate identical eccentric forces when rotated at identical speeds.

The shaft 102 has a helical gear 132 mounted thereon adjacent the reduced end 98 thereof, which gear 132 meshes with an identical similar gear 134 mounted on the shaft 108. The identical gears 132 and 134 thus insure that the two shafts 102 and 108 will rotate together in opposite directions, and at identical speeds.

The vibrator 58 is substantially identical in construction to the vibrator 60, and includes a pair of oppositely extending shaft ends 136 and 138 (FIG. 3) corresponding to 110 and 112 of FIG. 5. Secured to the shaft ends 112 and 138 are sprocket gears 140 and 142, respectively, and a toothed, flexible endless belt 144 interconnects said two sprocket gears. The extension 110 on the shaft 108 has one end of a universal coupling 146 secured thereto, and the shaft end 136 of the vibrator 58 has one end of a universal coupling 148 attached thereto.

Figure 3:
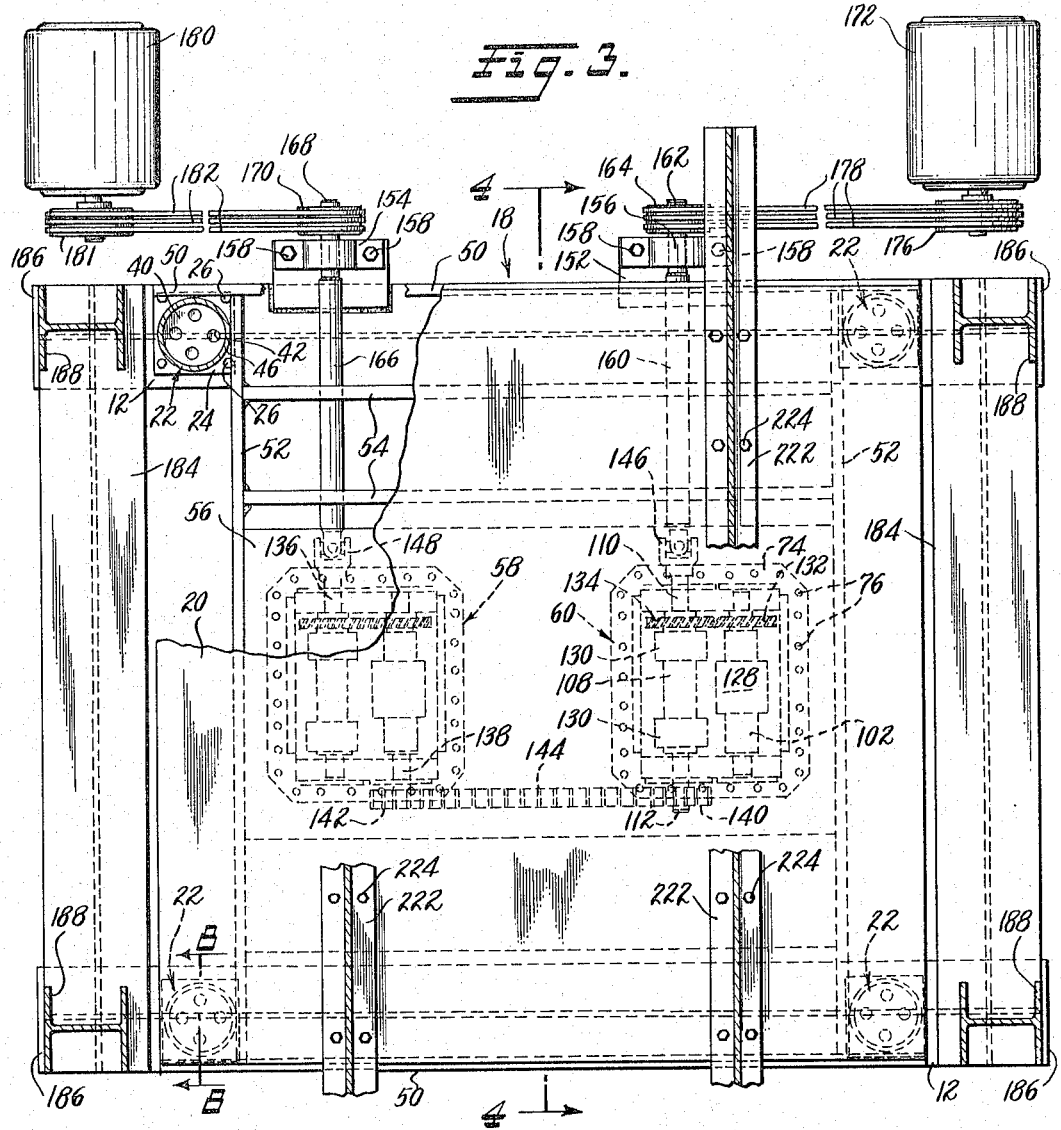
FIG. 3 is a fragmentary, horizontal sectional view, taken along the line 3—3 of FIG. 2, and showing the construction of the vibration table.

Referring to FIGS. 3 and 4, brackets 150 and 152 are welded to one of the I-beams 12 in position to confront the shaft ends 136 and 110, respectively, and pillow block bearings 154 and 156 are secured to said brackets 150 and 152 by bolts 158. A torque tube 160 is secured at one end thereof to the universal coupling 146, and has its other end telescoped over and welded to a stub shaft 162. The shaft 162 is received within the pillow block bearing 156, and has a multi-groove sheave 164 mounted thereon. Similarly, a torque tube 166 is connected to the universal coupling 148, and extends to a stub shaft 168 having a second multi-groove sheave 170 mounted thereon.

An electric motor 172 is secured to the floor 4 by bolts 174, with the sheave 176 on the output shaft thereof in alignment with the sheave 164; a plurality of flexible endless belts 178 drivingly interconnect said sheaves 176 and 164. A similar motor 180 is secured to the floor 4 with its output sheave 181 in alignment with the sheave 170, and is drivingly connected thereto by a plurality of belts 182. The electric motors 172 and 180 thus operate to effect rotation of the shafts of their respective vibrator units 60 and 58, and the sprocket gears 140 and 142 and the belt 144 maintain the two separate vibrator units 60 and 58 in synchronous operation, whereby to impart vibrations to the platform 18 according to a preselected pattern.

The vibrator units 58 and 60 can be adjusted to provide nearly any desired resultant direction of vibration. Referring in particular to FIGS. 6 and 7, the eccentric weights 128 and 130 are shown by full lines in FIG. 6 to be positioned so that they will simultaneously assume a straight up or straight down, vertical, dead-center position. When the weight 128 is in the position shown at A relative to the weights 130, the resultant vibration forces emanating from the vibrator unit 60 during one complete 360° rotation of the shafts 102 and 108 will be exerted in the opposite vertical directions indicated by the aligned arrows AA of FIG. 7; thus substantially pure vertical vibration of the platform 18 will result in this instance.

If the weight 128 is moved to the position indicated in phantom lines at B in FIG. 6, with the eccentric weights 130 remaining in their vertical position, rotation of the shafts 102 and 108 of the vibrator unit 60 through 360° will result in resultant forces in the directions of the arrows BB in FIG. 7. Similarly, if the weight 128 is rotated relative to the vertical positions for the weights 130 to assume the positions indicated by phantom lines at C and D, the resultant vibration forces will be as indicated in FIG. 7.

The relative positions for the shafts 102 and 108 can be easily adjusted by removing the cover plate 92, sliding the shaft 102 to the right until the gears 132 and 134 disengage, rotating the shaft 102 the desired amount, and then reassembling the vibrator unit. It is thus evident that the weights 128 and 130 of the vibrator unit 60 can be adjusted to provide a resultant vibrational force in substantially any direction, limited only by the number of teeth on the helical gears 132 and 134. The number of teeth on said gears 132 and 134 determine the minimum incremental angle obtainable between different relative angular positions for the shafts 102 and 108.

It is again emphasized that the sprocket gears 140 and 142 and the toothed belt 144 insure synchronous operation of the vibrator units 58 and 60. It is evident that by adjusting the eccentric weights of the two vibrator units 58 and 60 relative to each other, and/or by adjusting the sprocket gears 140 and 142 to the desired relationship, vibrational forces in nearly any direction can be obtained from the vibration table 6. For purposes of this invention, however, it has been found that vibration motion in a direction as nearly vertical as can be obtained is normally most desirable, for reasons hereinafter discussed; such vertical movements are obtained when the weights of both units 58 and 60 are positioned as in FIG. 6.

The framework 10 of the invention is partially supported by the I-beams 12, and includes a pair of spaced, transversely extending I-beams 184, which rest upon and are welded to the opposite ends of the I-beams 12. Vertical end plates 186 are welded to the end faces of I-beams 12, and extend upwardly to engage the I-beams 184, and are welded thereto.

Vertically disposed I-beams 188 are welded at their lower ends to the opposite ends of the transverse I-beams 184, and are bridged at their upper end by transverse I-beams 190. Longer, vertical I-beams 192 are secured to the floor 4 on either side of the vibration table 6 by anchor bolts 194, and are bridged at their upper ends by I-beams 196. The vertical I-beams 188 have a length sufficiently great so that the bridging I-beams 190 and 196 lie in a common plane.

Figure 2:
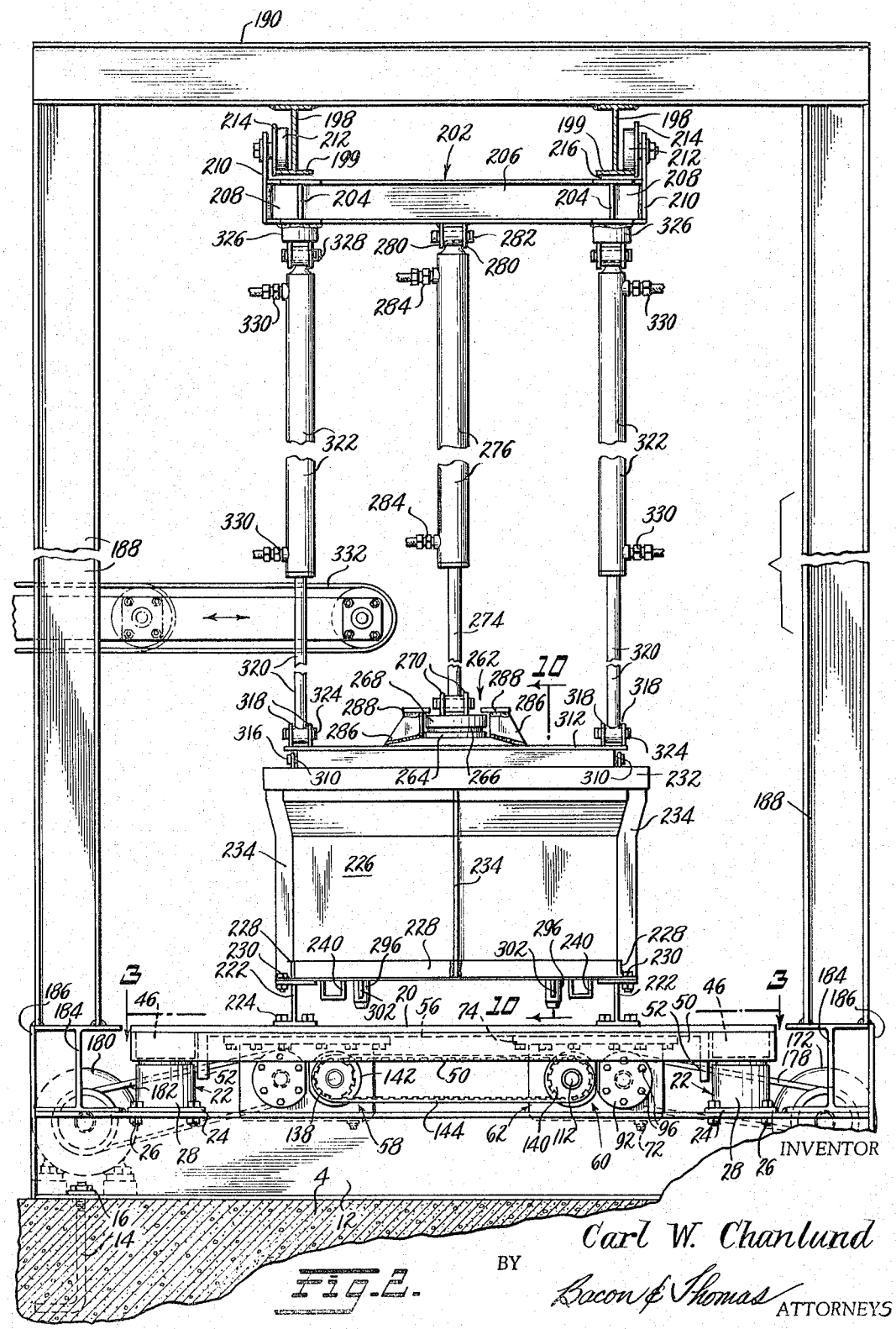
FIG. 2 is a fragmentary, vertical sectional view of the apparatus of FIG. 1, taken along the line 2—2 of FIG. 1.

As is best shown in FIG. 2, a pair of spaced, parallel I-beams 198 are welded to the undersides of the transverse bridging I-beams 190 and 196, and the lower, horizontal flanges 199 thereof together define a track extending from over the vibration table 6 to a curing area 200.

A carrier frame 202 is mounted on the rail I-beams 198, and includes a pair of longitudinally extending I-beams 204 interconnected by transverse I-beams 206. Stub I-beams 208 extend outwardly from the longitudinal beams 204, and have vertically projecting plates 210 welded thereto. A wheel 212, having a rim 214 on one end thereof, is rotatably mounted to the upper end of each plate 210, and is engageable on the lower flange 199 of one of the I-beams 198. Thus, the wheels 212 support the carrier frame 202, and enable it to be readily transported from a position over the vibration table 6 to the curing area 200. It should be noted that a small clearance 216 of about ⅛ of an inch is present between the top of the carrier frame 202 and the bottom of the track I-beams 198 when the wheels 212 are resting on the flanges 199, the purpose for said clearance 216 being described hereinafter.

Figure 11:
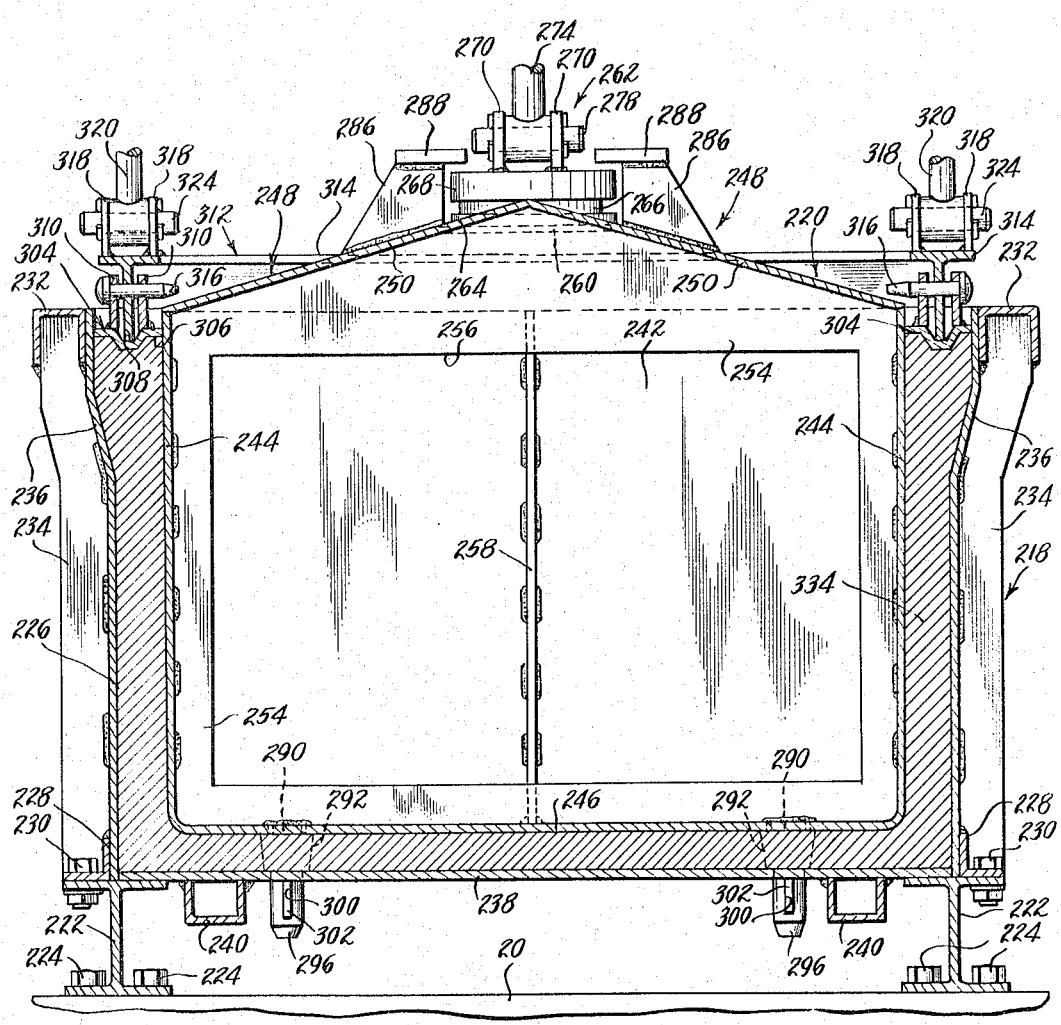
FIG. 11 is an enlarged, fragmentary, vertical sectional view, taken along the line 11—11 of FIG. 1, further showing the construction of the mold forms.
Figure 12:
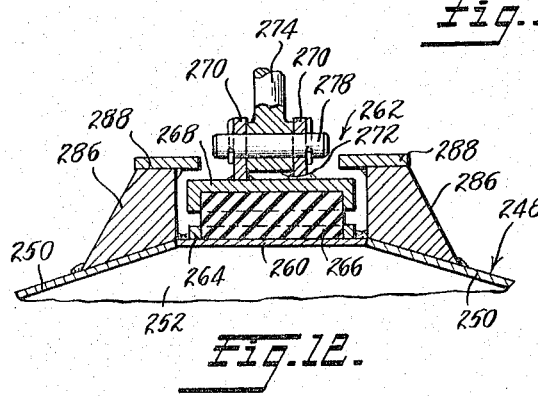
FIG. 12 is a vertical, sectional view, taken along the line 12—12 of FIG. 10, showing the construction of the cushion and hook arrangement for supporting and lifting the inner form of the mold.

The mold 8 is disposed to rest upon the vibration table 6, and includes an outer form 218 and an inner form 220. The construction of the mold 8 is best seen in FIGS. 10 to 12, reference to which is now made. The outer form 218 is disposed to rest upon the platform 18, and includes a pair of spaced, parallel I-beams 222 which are secured to the plate 20 of said platform 18 by bolts 224. A generally rectangular sheet metal box 226 is disposed with its lower lateral edges resting upon the upper faces of the I-beams 222, and has angle irons 228 welded to its lower lateral and end edges. Bolts 230 pass through the projecting flanges of the lateral angle irons 228 and the top flanges of the I-beams 222, and function to secure the box 226 in position.

Downwardly facing channel irons 232 are welded to the top lateral and end edges of the box 226 in position to confront the angle irons 228. A plurality of spaced, vertically extending reinforcing ribs 234 are welded to the exterior of the box 226, the opposite ends of said ribs being welded to the angle irons 228 and the channels 232. The box 226 has a reverse bend portion 236 near the upper end thereof, and the side walls of said box preferably taper slightly outwardly to facilitate removal of a molded product therefrom.

The outer form 218 is thus permanently secured to the vibrator table 6. Disposed to rest upon the I-beams 222 within the outer form 218 is a bottom plate, or pallet 238, the pallet 238 forming the bottom for the outer form 218. The pallet 238 has a pair of parallel, upwardly facing reinforcing channel members 240 welded to the lower face thereof.

The inner form 220 is constructed to fit within the outer form 218 in spaced relationship to the box 226, and the exterior walls thereof have a slight taper to facilitate removal thereof. The inner form 220 includes a pair of end walls 242, a pair of side walls 244, and a bottom wall 246, said walls 242, 244 and 246 being welded together at their adjacent edges.

The inner form 220 further includes a top 248 having the general configuration of a hip roof, said top including a pair of angled side plates 250 and a pair of angled end plates 252, the angled plates 250 and 252 being welded together along their adjacent edges, and being welded at their lower edges to the upper edges of the end walls 242 and the side walls 244. Disposed within the inner form 220 are a pair of spaced, transversely extending reinforcing plates 254, the perimeters of said plates having a configuration corresponding to the cross-sectional configuration of the inner form 220; the reinforcing plates have weight-reducing rectangular cutouts 256 therein, and are welded in position. The end walls 242 of the inner form 220 have vertical reinforcing ribs 258 welded thereto. Thus, the hollow inner form 220 is reinforced to withstand substantial external pressures exerted thereon.

A horizontal mounting plate 260 (FIG. 12) is welded within a cutout portion of the top 248 at each opposite end thereof, adjacent to the juncture between the side plates 250 and the end plates 252 of the top 248. Secured to each mounting plate 260 is a cushion and lifting hook assembly 262, best shown in FIGS. 11 and 12.

Each of the two assemblies 262 includes an annular flange 264 welded to one of the mounting plates 260, and having the lower end of a resilient cushion 266 received therein. An inverted, cup-shaped cover 268 is fitted over the top of each cushion 266, and has a pair of vertically extending ears 270 welded to the top surface thereof. The lower end 272 of the piston rod 274 of a hydraulic jack 276 is pivotally connected to each pair of ears 270 by a pin 278, the upper end of each of said hydraulic jacks 276 being connected to one of the transverse I-beams 206 of the carrier frame 202.

The I-beams 206 each have a pair of downwardly projecting ears 280 welded thereon, and a pin 282 passes through each said pair of ears 280 and through the upper end of an associated hydraulic jack 276. The hydraulic jacks 276 are of the double acting type, and have fluid connections 284 at the upper and lower ends of their respective cylinders. It is to be noted that two hydraulic jacks 276 are utilized, one for each of the assemblies 262.

Welded to the side plates 250 on diametrically opposite sides of each of the covers 268 are upwardly extending plates 286. Welded to the upper ends of the plates 286 are horizontally extending plates 288, which extend radially inwardly to overlap the diametrically opposite edges of their associated cover 268. The horizontal plates 288 are normally spaced slightly from their associated covers 268, and will engage with said covers only when the hydraulic jacks 276 are operated to lift the inner form 220 from its resting position within the outer form 218.

The lower face of the bottom wall 246 of the inner form 220 has four positioning pins 290 welded thereto to extend downwardly therefrom, said pins 290 being positioned at the corners of an imaginary rectangule. The pins 290 are best shown in FIGS. 10 and 11, and each includes a downwardly tapering frusto-conical portion 292 terminating at its lower end in a radial shoulder 294. Each pin 290 further includes a cylindrical shaft portion 296 on its lower end, which shaft portion extends through an aligned opening 298 in the pallet plate 238; each shaft portion 296 has a transverse slot 300 extending therethrough for reception of a wedge 302.

The inner form 220 is assembled within the outer form 218 in the following manner. The pallet plate 238 can either be first placed within the outer form 218, or it can initially be positioned at a distance from said outer form. In either case, the hydraulic jacks 276 and the carrier frame 202 are utilized to lift the inner form 220, and to position it over the pallet 238. The inner form 220 is then lowered, whereby the shaft portions 296 of the positioning pins 290 will pass through the bores 298. After the shoulders 294 have engaged the pallet plate 238, the wedges 302 are driven home to secure the pallet 238 to the inner form 220. The inner form 220 and pallet assembly 238 are then placed within the outer form 218, provided the pallet 238 was not initially positioned within said outer form.

Disposed to fit within the peripheral space between the upper ends of the inner form 220 and the outer form 218 is a rectangular pressure form 304, said form 304 comprising a horizontal plate 306 having a general V-shaped groove 308 therein. The rectangular form 304 has pairs of upwardly extending ears 310 welded thereto medially of each of its side portions. The pressure form 304 is adapted for connection to a rectangular pressure frame 312.

The pressure frame 312 is also rectangular in configuration, and is comprised of four T-shaped members 314 welded together at their mating corners. The vertical legs of the lateral members 314 are receivable between the ears 310 on the pressure form 304, and are detachably connected thereto by pins 316 which pass through aligned bores in said ears 310 and said vertical legs. The upper face of the pressure frame 312 has pairs of upwardly extending ears 318 welded thereto near its four corners and on the opposite ends of the laterally extending, T-shaped members 314. The lower ends 320 of hydraulic jacks 322 are received within each pair of ears 318, and are secured thereto by pins 324. The upper end of each hydraulic jack 322 is secured to the carrier frame 202 by brackets 326 and pins 328. Each hydraulic jack 322 is of the double acting type, and has fluid fittings 330 near the opposite upper and lower ends thereof.

The operation of the concrete product producing apparatus of the invention is as follows. After the inner form 220 has been placed within the outer form 218, the vibrator units 58 and 60 are started in motion. A conveyor 332 (FIGS. 1 and 2) is then extended over the mold 8, and a concrete mixture is dumped into the chamber defined between the outer and inner forms 218 and 220 of said mold. The concrete mixture employed is preferably of the type known to the trade as a soil damp, or a no slump, mixture. The vibrating action established by the vibrators 58 and 60 cause the concrete mixture to quickly settle into said chamber, and to become compacted.

After the desired quantity of concrete mixture has been inserted into the mold 8, the conveyor 332 is withdrawn. The pressure frame 312, having the pressure form 304 detachably connected thereto, is then lowered with the use of the hydraulic jacks 322. The pressure form 304 is received within the space between the upper ends of the outer form 318 and the inner form 320, and is forced downwardly by the four hydraulic jacks 322. Downward pressure by the hydraulic jacks 322 is maintained while the vibrators 58 and 60 continue in operation, until the concrete mixture within the mold is properly distributed and compacted.

It should be noted that when the hydraulic jacks 276 and 322 are extended against the mold components, the carrier frame 202 will be moved upwardly against the track I-beams 198, whereby the clearance 216 will be eliminated. When the top surface of the frame 202 is in engagement with the bottom surface of the track I-beams 198, the wheels 212 will be rendered ineffective, and the inner form 220 and the pressure form 304 will be fixed in position. The resilient cushions 266 function to absorb shocks which could be otherwise transmitted from the vibration table 6 to the extended hydraulic jacks 276, the upper face of the cap 268 being spaced below the horizontal plates 288 when the jacks 276 are extended and during operation of said vibration table 6, whereby during operation of the vibration table the mold structure 8 is in effect clamped between the resilient cushions 38 and 266.

After the concrete mass has been sufficiently distributed and compacted, the vibrators 58 and 60 are turned off. The pins 316 are then removed, and the pressure frame 312 is elevated by the hydraulic jacks 322. The hydraulic jacks 276 are then actuated to lift the inner form 220 vertically from within the outer form 218, together with the attached pallet plate 238, the molded concrete product 334, and the upper press form 304.

When the hydraulic jacks 322 are holding the pressure frame 312 above the mold 8, and after the hydraulic jacks 276 have been activated to lift the inner form 220, the wheels 212 will again come into contact with the lower flanges 199 of the track I-beams 198.

Thereafter, the carrier frame 202 can be readily moved to the curing area 200.

The carrier frame 202, with its load attached, is then transported to the curing area 200, where the hydraulic jacks 276 are actuated to lower the pallet plate 238 onto a pair of spaced supports 336. After the product is resting on supports 336, the wedges 302 are immediately removed, and the inner form 220 is lifted from the concrete product 334; the manufacturing cycle to this point typically takes but about 4 minutes. The pressure form 304 is also removed after a sufficient time has elapsed for the product to take an initial set (usually from 1 to 2 hours), and these elements can again be utilized within the outer form 218 to produce a concrete product. The pallet plate 238 will normally remain in position until the concrete product 334 is completely cured.

The vibration table 6 of the invention is thus constructed to insure that the concrete mixture utilized to manufacture a product will be thoroughly distributed and compacted within its mold. The use of the two vibrator units 58 and 60, which are driven by separate motors 172 and 180, and which are maintained in synchronous operation by the sprocket gears 140 and 142 and the toothed belt 144, provide controlled vibration over the entire length of the vibration table 6. Each vibrator unit 58 or 60 is itself adjustable by altering the relative positions of the helical gears 132 and 134, whereby to produce substantially any desired direction of vibration.

The concrete product producing apparatus 2 of the invention readily lends itself to the large scale production of molded articles, the unique combination of forms, the mold handling equipment, and the vibrating table insuring that all products will have the same desired physical characteristics. The hydraulic jacks 276 and 322 are positioned for dual use, in that they all both position and handle the mold components, and also provide pressure in cooperation with the vibration table 6 to distribute and compact a concrete mixture received within the mold 8. It is thus apparent that each of the objects hereinabove set forth for the present invention are satisfied.

It will be apparent that the rail beams 198 may extend any desired distance, in one or both directions from the table 6, to extend over any desired number of curing areas 200. Thus, a multiplicity of molded articles can be supported by supports such as 336 for simultaneous curing.

Figure 13:
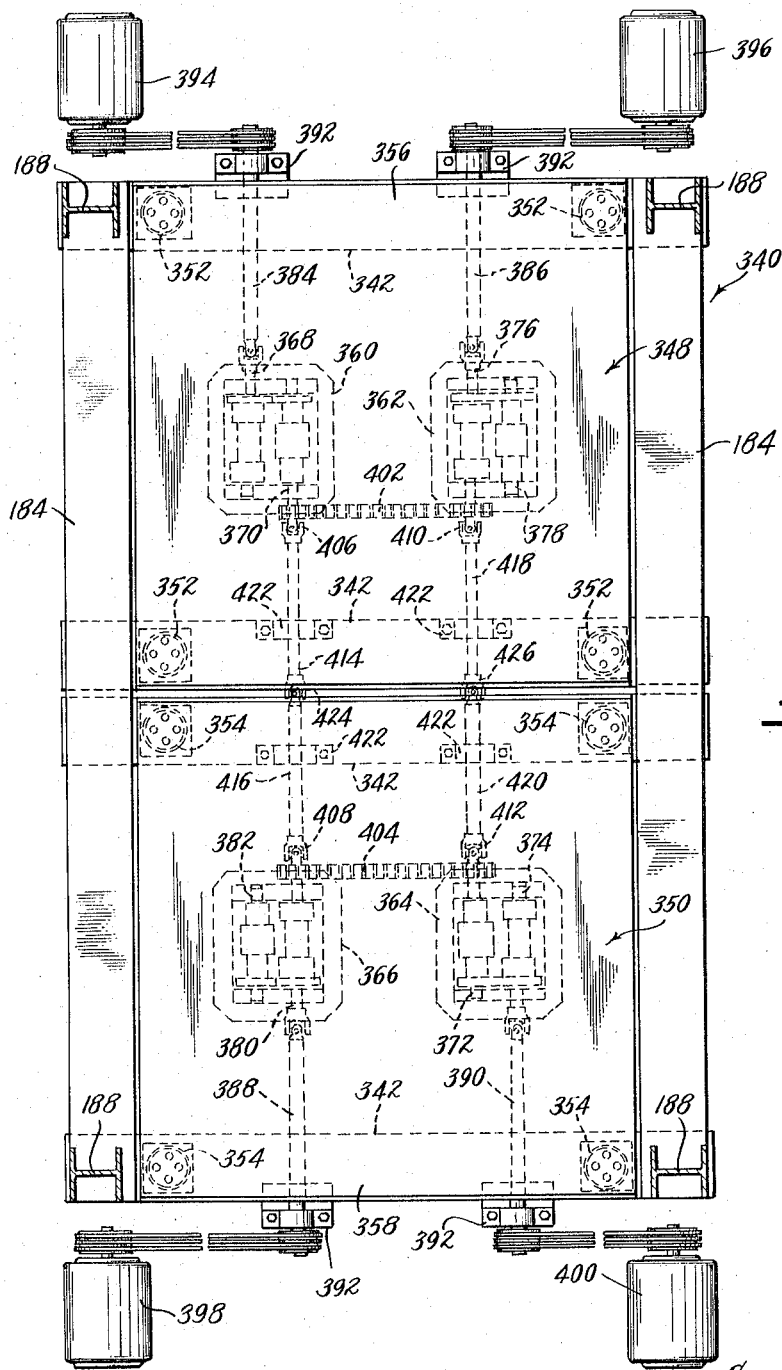
FIG. 13 is a top fragmentary view of a modified embodiment of the invention, employing two interconnected vibration tables.

A modified embodiment of the invention is illustrated in FIG. 13, wherein two vibration tables are employed, the two tables being interconnected to effect synchronous operation. The embodiment of FIG. 13 is especially useful in the manufacture of larger and heavier concrete products.

Referring to FIG. 13, the dual vibrator table apparatus includes a supporting base 340, comprising I-beams 342, 344 and 346, which correspond to the I-beams 12, 184 and 188, respectively. Mounted on the base 340 are two vibration tables 348 and 350, which are supported by cushion legs 352 and 354, respectively, that are identical to the cushion legs 22.

The tables 348 and 350 include platforms 356 and 358 respectively, each of which has a pair of vibrator units 360 and 362, and 364 and 366, respectively, secured to the underside thereof. The vibrator units 360 and 364 are identical to the vibrator unit 58, and each include a pair of shafts 368 and 370, and 372 and 374, respectively. Similarly, the units 362 and 366 are identical to the vibrator unit 60, and include pairs of shafts 376 and 378, and 380 and 382, respectively.

The shafts 368, 376, 380 and 374 are connected to drive shafts 384, 386, 388 and 390, respectively, which extend through pillow block bearings 392, and which are supplied with power from motors 394, 396, 398 and 400, respectively. The shafts 370 and 376 are fitted with sprocket gears, and are maintained in synchronism by a belt 402 identical to the toothed belt 144; similarly, the vibrator units 364 and 366 are maintained in synchronous relation to each other by a toothed belt 404 that connects, through sprocket gears, the shafts 380 and 372.

The two vibration tables 348 and 350 of FIG. 13 are also provided with means for effecting synchronous operation thereof whereby the desired vibration force pattern may be obtained. Referring to the drawing, the confronting ends of the shafts 370, 380, 376 and 372 are provided with couplings 406, 408, 410 and 412, respectively, which connect them to connecting shafts 414, 416, 418 and 420, respectively. The connecting shafts 414, 416, 418 and 420 are supported near the ends thereof remote from their respective vibrator units by pillow block bearings 422.

The confronting ends of the connecting shafts 414 and 416 are connected by a coupling 424, and the confronting ends of the shafts 418 and 420 are connected by a similar coupling 426. Thus, shaft 376 will rotate in synchronism, because of the connected shafts 418 and 420, with shaft 372, and because of the connected shafts 414 and 416, shaft 370 will be in synchronous with shaft 380. Since the belts 402 and 404 will maintain the shaft pair 370 and 376 and the shaft pair 380 and 372, respectively, in synchronous, it is thus seen that all four vibration units 360, 362, 364 and 366, and hence the two tables 348 and 350, will also be in synchronism. It is also apparent that by adjusting the relative initial positions of the four vibrator units, the pattern of vibration obtained from the dual table apparatus of FIG. 13 can be readily varied.

Obviously, many modifications and variations of the present invention are possible in the light of the above teachings. It is, therefore, to be understood that within the scope of the appended claims, the invention may be practiced otherwise than as specifically described.

I claim:

1. In an apparatus for producing a molded product, a base; a table adapted to support a mold; a plurality of legs supporting said table above said base, and constructed to cushion shock forces applied to said table to lessen their effect on said base; vibrator means secured to the underside of said table, and operable to vibrate said table at least in a vertical direction; and means positioned above said table, and movable vertically downwardly theretoward to apply pressure to material contained within a mold supported on said table while the mold is being vibrated in a vertical direction by said table.

2. The apparatus as recited in claim 1, wherein each of said legs comprises: a lower cylinder secured to said base; an upper cylinder secured to said table, and positioned to confront said lower cylinder, the confronting ends of said upper and said lower cylinders having confronting sockets therein; and a cushion of resilient material disposed within said sockets between said plates, said cushion having a thickness greater than the combined depths of said sockets, at least one of said cylinders having extrusion hole means in communication with the socket therein, positioned to confront said cushion.

3. The apparatus as recited in claim 1, wherein said vibrator means includes: a plurality of vibrator units secured to the underside of said table; motor means for driving each vibrator unit; and adjustable means interconnecting said vibrator units to effect synchronous operation thereof.

4. The apparatus as recited in claim 3, wherein each of said vibrator units comprises: a housing, a pair of parallel shafts rotatably mounted adjacent their opposite ends within said housing, one end of one of said shafts projecting beyond said housing for reception of a power transmission element connected to said motor means, one end of the other shaft extending beyond said housing and having an element thereon to be drivingly interconnected with the other vibrator unit; gear means interconnecting said shafts to effect simultaneous opposite rotation thereof at identical speeds; and eccentric weight means on each of said shafts.

5. The apparatus as recited in claim 3, including additionally: a second table; a second plurality of cushion legs supporting said second table above said base; a second vibrator means secured to the underside of said second table, and including: a second plurality of vibrator units; second motor means for driving each of said second vibrator units; and second adjustable means interconnecting said second vibrator units to effect synchronous operation; and means interconnecting said second vibrator units and said first mentioned vibrator units to effect synchronous operation thereof.

6. The apparatus as recited in claim 1, wherein said mold includes an upwardly facing, material receiving chamber, and wherein said pressure applying means includes: a pressure form receivable within said chamber; a supporting frame secured to said base, and extending above said table; and at least one hydraulic means connected to extend between said pressure form and said supporting frame, and operable to move said pressure form toward and away from said mold.

7. Apparatus for producing a hollow molded product, comprising: a base; a table; a plurality of legs supporting said table above said base, and constructed to cushion shock forces applied to said table to lessen their effect on said base; vibrator means secured to the underside of said table, and operable to vibrate said table in a preselected manner; a framework extending above said table; a mold supported on said table, and comprising: an outer form secured to said table; and an inner form receivable within said outer form, said inner and outer forms defining therebetween a chamber for receiving material for forming said product; at least one hydraulic means connected between an element supported by said framework and said inner form, and arranged to lift said inner form from said outer form, and to hold said inner form in position within said outer form; a shock absorbing cushion means interposed between said hydraulic means and said inner form; and means supported by said framework for selectively exerting a compressive force on material contained within said mold chamber while said table supporting said mold is being vibrated.

8. The apparatus as recited in claim 7, wherein said framework includes a track, and wherein said framework element connected to said hydraulic means comprises: a carrier frame; a plurality of supports extending upwardly from said carrier frame; and a wheel mounted on each of said supports and engageable with said track, whereby to suspend said carrier frame below said track, said supports projecting upwardly sufficiently from said carrier frame to provide a clearance between said carrier frame and said track when said wheels are in engagement with said track.

9. The apparatus as recited in claim 8, wherein said means for selectively exerting compressive force comprises: a pressure form receivable within said chamber; a pressure frame detachably connected to said pressure form; and at least one hydraulic means connected to extend between said carrier frame and said pressure frame.

10. The apparatus as recited in claim 7, wherein said shock absorbing cushion means comprises: a base secured to said inner form; a cover secured to the lower end of said hydraulic means, and positioned to confront said base on said inner form; a resilient cushion disposed between said base on said inner form and said cover; and a pair of diametrically opposed hook elements secured to said inner form, and terminating above said cover, said cover being engageable with said hooks when said hydraulic means is operated to lift said inner form from within said outer form.

11. A vibration table, comprising: a base; a table platform; a plurality of legs supporting said platform above said base, and constructed to cushion shock forces applied to said table to lessen their effect on said base; a plurality of vibrator units secured to the underside of said platform; a separate motor means connected to each vibrator unit to drive the same; and means interconnecting the driven vibrator units to effect synchronous operation thereof.

12. A vibration table as recited in claim 11, wherein each of said legs comprises: a lower cylinder secured to said base; an upper cylinder secured to said table platform, and positioned to confront said lower cylinder, the confronting ends of said upper and said lower cylinders having sockets therein; a pair of supporting plates, one seated within each of said sockets, each of said plates having a plurality of extrusion holes extending therethrough; and a resilient cushion having its opposite ends received within said sockets and in contact with said supporting plates, said cushion having a thickness substantially greater than the distance measured between said supporting plates when said confronting ends of said cylinders are in engagement.

13. A vibration table as recited in claim 11, wherein each of said vibrator units comprises: a housing; a pair of parallel shafts rotatably mounted within said housing; gear means mounted on said shafts, and arranged to effect simultaneous opposite rotation thereof at identical speeds; an eccentric weight means on each of said shafts, one end of one of said shafts projecting through said housing for connection to said motor means, and wherein another end of one of said shafts extends through said housing and has a sprocket gear mounted thereon, said means interconnecting said vibrator units to effect synchronous operation comprising a continuous loop means engaging and extending around said sprocket gears on said vibrator units.

14. A vibration table as recited in claim 13, wherein said continuous loop means comprises: an endless flexible belt having spaced teeth on the inner face thereof of a size to mesh with the teeth on said sprocket gears to maintain said sprocket gears in predetermined angular relation to each other.

15. A cushion leg for supporting one member above another member, comprising: a lower cylinder secured to project upwardly from the lower one of said members; an upper cylinder secured to project downwardly from the upper one of said members and to confront said lower cylinder, the confronting ends of said cylinders having axially extending sockets therein; a pair of supporting plates, one of said plates being seated within each of said sockets, and both of said plates having a plurality of spaced extrusion holes therethrough; and a resilient member received within said sockets and engageable with said supporting plates, said resilient member having a thickness substantially greater than the distance measured between said supporting plates when said confronting cylinders are in engagement.

16. A cushion leg as recited in claim 15, wherein said resilient member is made from gum rubber, and wherein the edges of said extrusion holes which confront said resilient member are rounded.

17. In a machine for making a molded product: a vibration table having vibrator means secured to the underside thereof; first cushion means supporting the vibration table, said vibration table being arranged to receive a mold thereon; means above the vibration table for clamping the mold to said vibration table, said clamping means including second cushion means, and means for applying pressure to said second cushion means sufficient to cause said clamping means to clamp the mold on the vibration table to be vibrated thereby, but insufficient to prevent the vibration of the mold by said vibration table.

18. In combination, means for clamping a mold, comprising: opposed confronting cushioning means arranged to be effective on opposite ends of the mold for clamping the mold therebetween; and means including a table for directly vibrating the mold while disposed in clamped relation between said cushioning means.

19. A vibration table, comprising: a base; a table platform; a plurality of cushion legs supporting said platform above said base, each of said legs comprising: a lower cylinder secured to said base; an upper cylinder secured to said platform, and positioned to confront said lower cylinder, the confronting ends of said upper and said lower cylinders having sockets therein; a pair of supporting plates, one of said plates being seated within each of said sockets, and both of said plates having a plurality of extrusion holes extending therethrough; and a resilient cushion member partially received within said sockets and engaged with said supporting plates, said resilient member having a thickness substantially greater than the distance measured between said supporting plates when said confronting cylinders are in engagement; at least one vibrator unit secured to the underside of said platform, said unit comprising: a housing, including a pair of spaced end walls; bearing means carried by said end walls; a pair of parallel shafts rotatably mounted at their opposite ends within said bearing means, one end of one of said shafts projecting through said housing for connection with a power source; intermeshed gear means on said shafts arranged to cause said shafts to rotate simultaneously in opposite directions and at identical speeds; and an eccentric weight means on each of said shafts; and motor means connected to said projecting shaft end.

References Cited by the Examiner

UNITED STATES PATENTS

| | | | |
|---|---|---|---|
| 1,079,563 | 11/1913 | Knight | 25—41 |
| 1,574,985 | 3/1926 | McWain | 25—41 |
| 1,836,444 | 12/1931 | Carnahan | 214—18.2 |
| 2,188,482 | 1/1940 | Parks | 74—61 |
| 2,258,059 | 10/1941 | Kessler | 74—61 |
| 2,407,168 | 9/1946 | Lindkvist | 25—41 |
| 2,589,115 | 3/1952 | Nelson et al. | 25—41 |
| 2,614,308 | 10/1952 | Burkard et al. | 25—41 |
| 2,624,928 | 1/1953 | Long | 25—83 |
| 2,819,046 | 1/1958 | Jandris et al. | 25—41 |
| 2,870,513 | 1/1959 | Gagne | 25—41 |
| 2,914,313 | 11/1959 | Morris | 267—1 |
| 2,972,895 | 2/1961 | Wilson | 74—61 |
| 3,103,348 | 9/1963 | Paulsen | 267—1 |
| 3,201,843 | 8/1965 | Osweiler | 25—30 |

FOREIGN PATENTS 251,606   8/1948   Switzerland.

J. SPENCER OVERHOLSER, *Primary Examiner.*

MICHAEL V. BRINDISI, *Examiner.*

G. A. KAP, R. D. BALDWIN, *Assistant Examiners.*